United States Patent
Wang et al.

(10) Patent No.: US 11,392,611 B2
(45) Date of Patent: Jul. 19, 2022

(54) BLOCKCHAIN BASED IOT DATA MANAGEMENT

(71) Applicant: International Business Machines Corporation, Armonk, NY (US)

(72) Inventors: Xinlin Wang, Irvine, CA (US); Jun Zhu, Shanghai (CN); Zhi Hu Wang, Beijing (CN); Timothy J. Hahn, Cary, NC (US); Peng Ji, Nanjing (CN)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 16/377,483

(22) Filed: Apr. 8, 2019

(65) Prior Publication Data

US 2020/0320085 A1 Oct. 8, 2020

(51) Int. Cl.
  *G06F 16/27* (2019.01)
  *H04L 9/00* (2022.01)
  *G06N 20/00* (2019.01)

(52) U.S. Cl.
  CPC ............ *G06F 16/27* (2019.01); *G06N 20/00* (2019.01); *H04L 9/50* (2022.05)

(58) Field of Classification Search
  CPC ........ G06F 16/27; H04L 2209/38; H04L 9/50
  See application file for complete search history.

(56) References Cited

U.S. PATENT DOCUMENTS

| 10,117,101 | B2 | 10/2018 | Girdhar et al. |
| 2014/0337274 | A1* | 11/2014 | Unnikrishnan ........ G06N 5/047 706/48 |
| 2019/0245680 | A1* | 8/2019 | Boutaba ................ G06F 21/64 |
| 2020/0134205 | A1* | 4/2020 | Hsiao ................... H04L 9/3242 |
| 2021/0126826 | A1* | 4/2021 | Nolan .................... H04L 41/12 |

FOREIGN PATENT DOCUMENTS

| CN | 108073093 A | 5/2018 |
| WO | 2018126065 A1 | 7/2018 |

OTHER PUBLICATIONS

Mahdavinejad, M. S., Rezvan, M., Barekatain, M., Adibi, P., Barnaghi, P., & Sheth, A. P. Machine learning for Internet of Things data analysis: A survey. (2018) Digital Communications and Networks, 4(3), 161-175. (Year: 2018).*

Ayoade, Gbadebo, et al. "Decentralized IoT data management using blockchain and trusted execution environment." 2018 IEEE International Conference on Information Reuse and Integration (IRI). IEEE, 2018. (Year: 2018).*

(Continued)

*Primary Examiner* — William B Partridge
*Assistant Examiner* — Lana Alagic
(74) *Attorney, Agent, or Firm* — Mark Bergner

(57) ABSTRACT

Blockchain based IoT data management can include receiving IoT data are with one or more processing units. At least one aggregation pattern of the IoT data can be determined by one or more processing units. The IoT data can be hashed, based upon the at least one aggregation pattern to obtain hash values of the IoT data by one or more processing units. The hash values can be sent to a blockchain system for storing by one or more processing units.

18 Claims, 9 Drawing Sheets

(56) References Cited

OTHER PUBLICATIONS

Xiaolei Ma, Yao-Jan Wu, Yinhai Wang, Feng Chen, Jianfeng Liu, "Mining smart card data for transit riders' travel patterns", (2013) Transportation Research Part C: Emerging Technologies, vol. 36: pp. 1-12, ISSN 0968-090X, https://doi.org/10.1016/j.trc.2013.07.010. (Year: 2013).*

Ayoade et al., "Decentralized IoT Data Management Using BlockChain and Trusted Execution Environment," 2018 IEEE International Conference on Information Reuse and Integration for Data Science, 2018, pp. 15-22.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

\* cited by examiner

| 701 Identity Mapping ||
|---|---|
| Identity 1 | Hash-ids |
| Identity 1 | Hash-ids |

| 703 Type Mapping ||
|---|---|
| Type 1 | Hash-ids |
| Type 2 | Hash-ids |

| 705 Keyword Mapping ||
|---|---|
| Keyword 1 | Hash-ids |
| Keyword 2 | Hash-ids |

FIG. 7

BLOCKCHAIN BASED IOT DATA MANAGEMENT

BACKGROUND

The present disclosure relates to information management, and more particularly, to a method, system and computer program product for blockchain-based IoT data management.

The internet of things (IoT) is an electronic network of physical devices, vehicles, home appliances, and other items embedded with electronics, software, sensors, actuators, and connectivity which enables these things to connect, collect and exchange data. As an increasing amount of IoT data is collected, the management of this large amount of IoT data becomes in increasingly difficult problem.

A blockchain is a growing list of records, referred to as blocks, which are linked using cryptography. Each block can contain a cryptographic hash of the previous block, a timestamp, and transaction data, generally represented as a Merkle tree root hash. A blockchain is, by design, resistant to malicious or unintentional modification of the data. A blockchain system can be used to provide a secure, trusted and distributed storage infrastructure for data management and consumption.

SUMMARY

This summary is provided to introduce a selection of concepts in a simplified form that are further described herein in the detailed description. This summary is not intended to identify key factors or essential features of the claimed subject matter, nor is it intended to be used to limit the scope of the claimed subject matter.

According to embodiments of the present disclosure, there is provided a computer-implemented method. According to the method, IoT data are received by one or more processing units. At least one aggregation pattern of the IoT data is determined by one or more processing units. The IoT data are hashed based on the at least one aggregation pattern to obtain hash values of the IoT data by one or more processing units. The hash values are sent to a blockchain system for storing by one or more processing units.

In some embodiments, a system and/or apparatus is provided. The system/apparatus can include one or more processors and a memory coupled to the one or more processors. The memory can include instructions which, when executed by the one or more processors, cause the one or more processors to perform various ones of, and combinations of, the operations outlined above with regard to the method illustrative embodiment.

In some embodiments, a computer program product comprising a computer useable or readable medium having a computer-readable program is provided. The computer-readable program, when executed on a computing device, causes the computing device to perform various ones of, and combinations of, the operations outlined above with regard to the method illustrative embodiment.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7 depicts mappings between a hash value and IoT device identity, data type and data keywords respectively, according to embodiments consistent with the figures.

Figure 1:
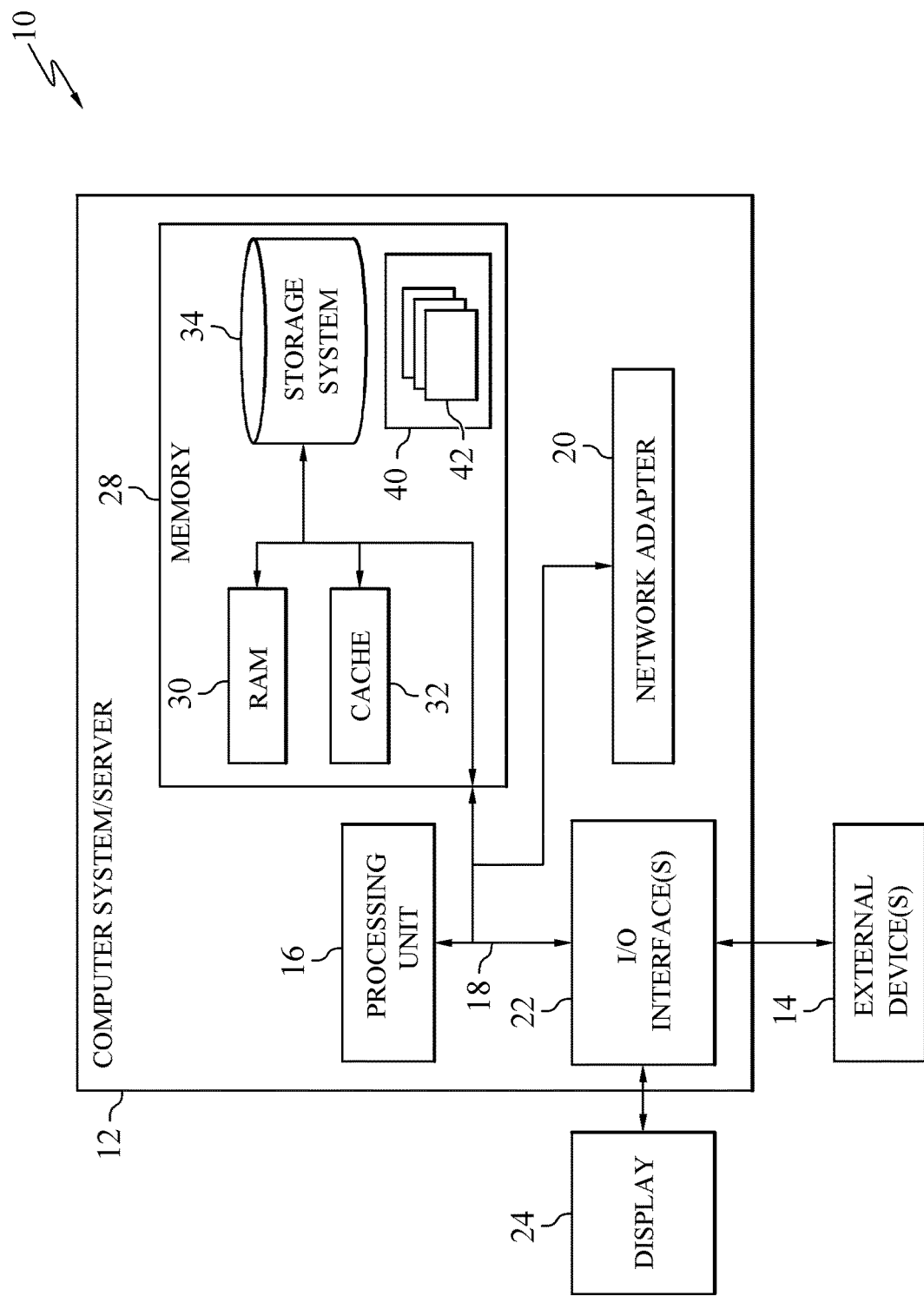
FIG. 1 depicts a cloud computing node, according to embodiments of the present disclosure.

While the invention is amenable to various modifications and alternative forms, specifics thereof have been depicted by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure can be capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 1 includes a schematic depiction of an example cloud computing node. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special-purpose computing system environments or configurations. Examples of well-known computing systems, environments, and/or configurations that can be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As depicted in FIG. 1, computer system/server 12 in cloud computing node 10 is depicted in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not depicted and typically called a "hard drive"). Although not depicted, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the disclosure.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the disclosure as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not depicted, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
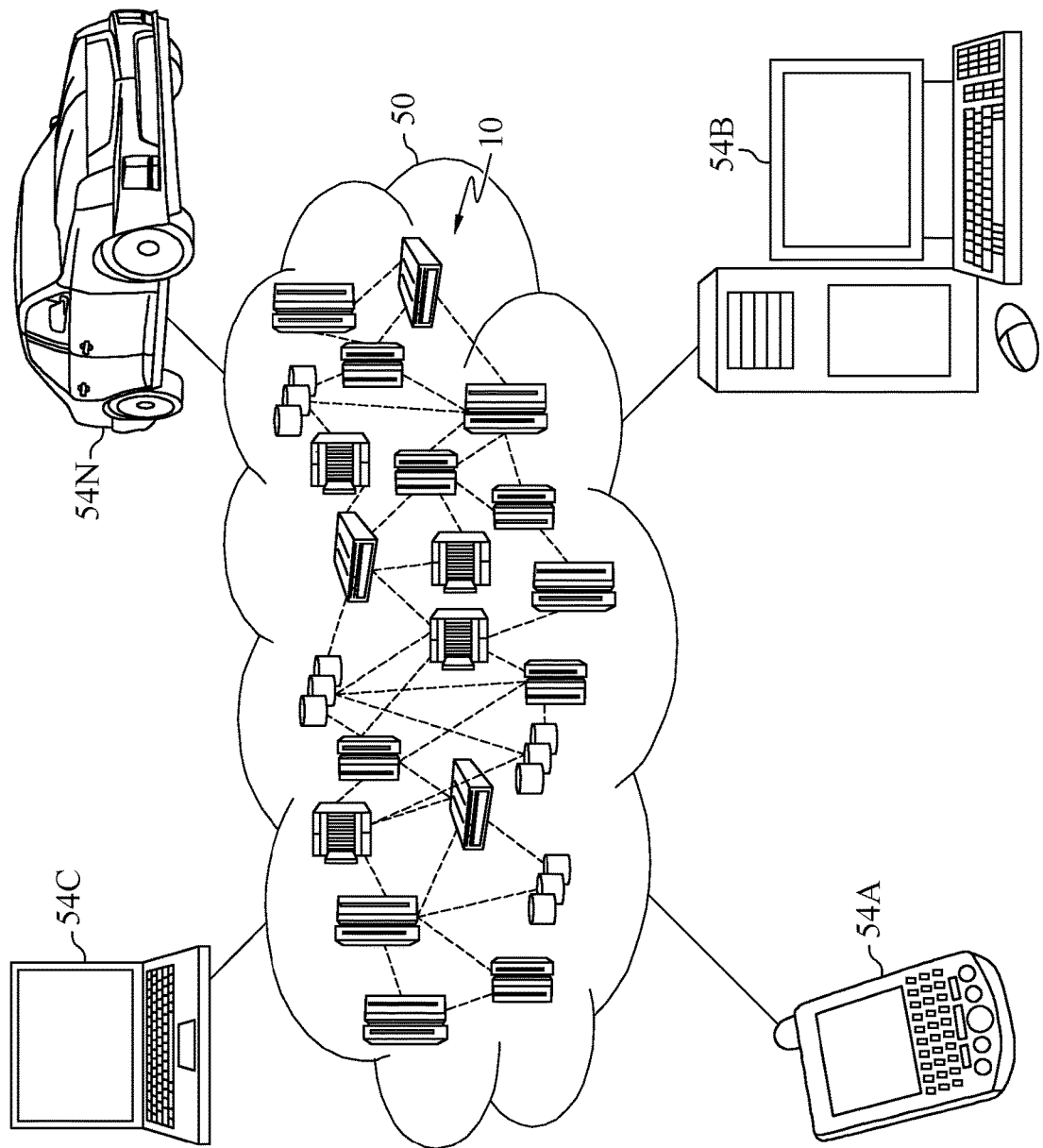
FIG. 2 depicts a cloud computing environment, according to embodiments consistent with the figures.

FIG. 2 depicts a cloud computing environment 50. As depicted, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not depicted) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted in FIG. 2 are intended to be illustrative only and that computing nodes 10 and cloud computing environment 50 can communicate with any type of computerized device over any type of network and/or network addressable connection (e.g., using a web browser).

Figure 3:
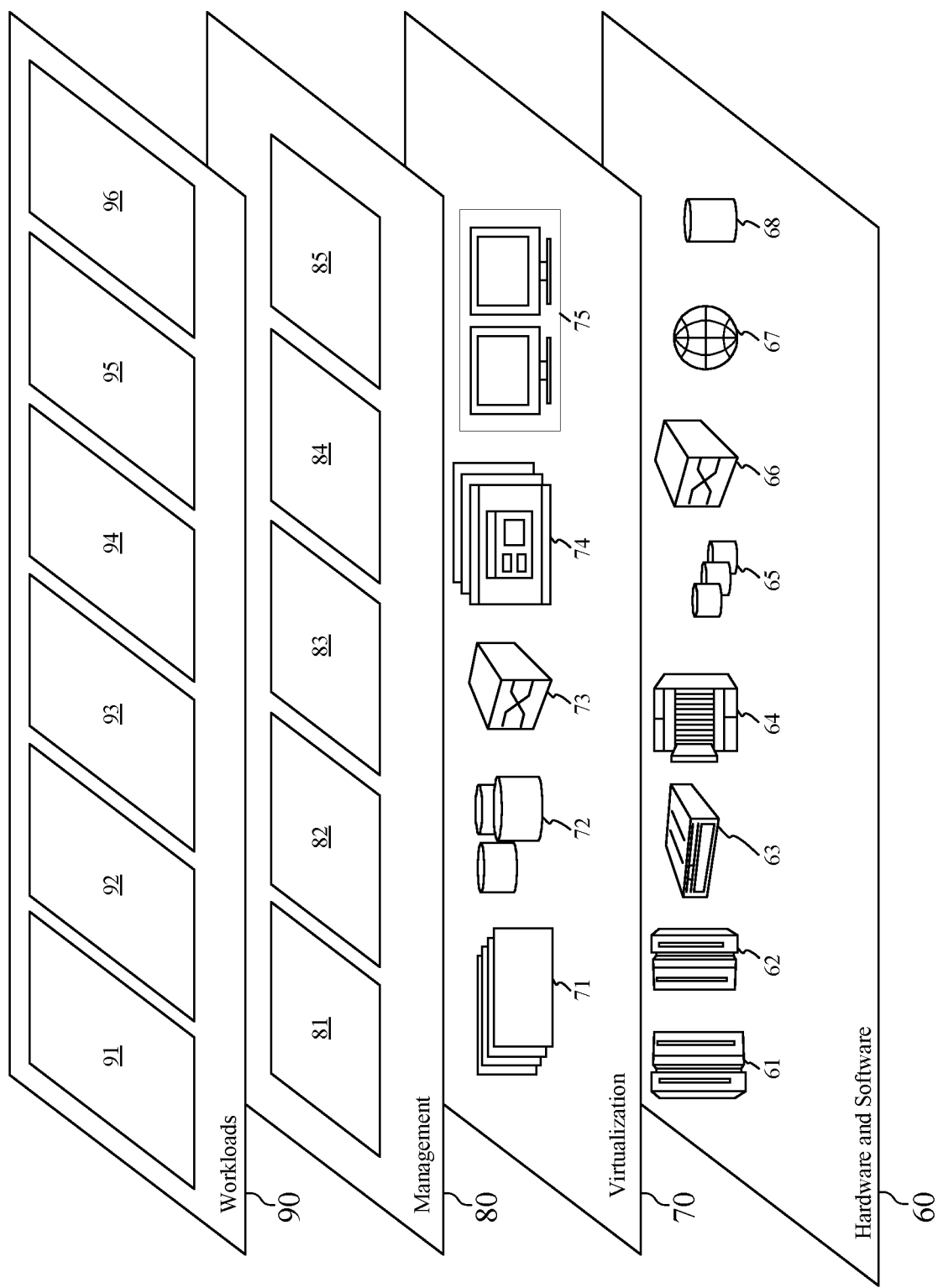
FIG. 3 depicts abstraction model layers, according to embodiments consistent with the figures.

FIG. 3 depicts a set of functional abstraction layers provided by cloud computing environment 50, FIG. 2. It can be understood in advance that the components, layers, and functions depicted in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and blockchain-based IoT data management 96.

Presently, how to manage the large amount IoT data can be a significant challenge. IoT data includes specific characters such as huge volume, continuous enriching, and frequent usage on various patterns, e.g., time-series query, location-based retrieving, etc. Another challenge for IoT data management is how to prevent the data from being tampered with. Blockchain can be a good choice. However, currently data stored in blockchain system are in quite small size, due to the capacity of each blockchain. Therefore, a special design is needed to store IoT data in a blockchain system in a secure and trustable way, preferably, also to efficiently query and locate such IoT data.

Figure 4:
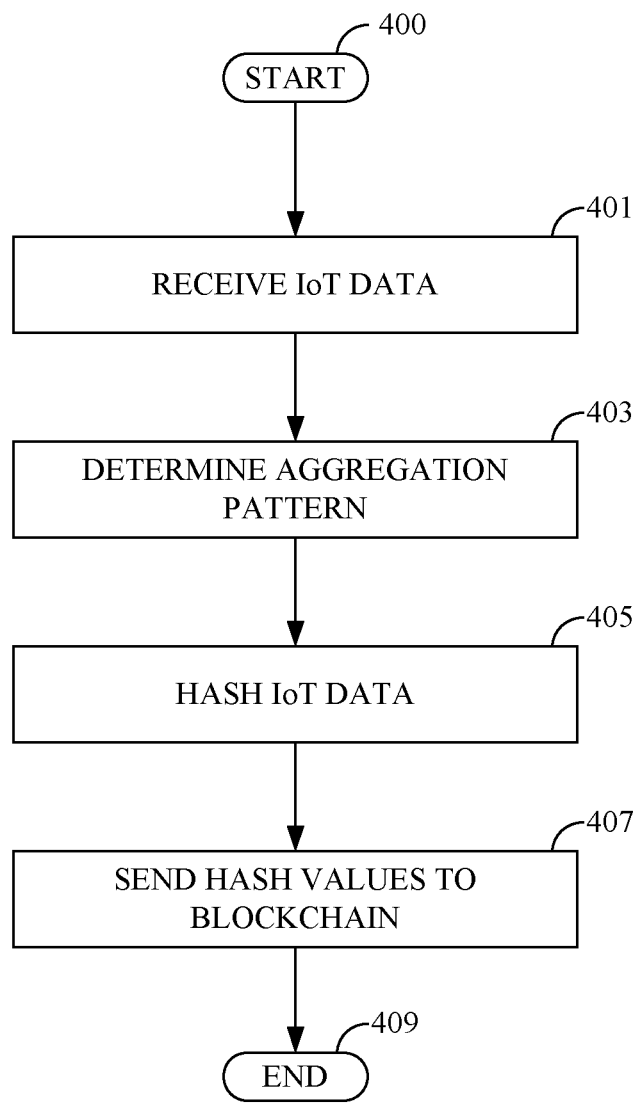
FIG. 4 depicts a method of IoT data management based on a blockchain system, according to embodiments consistent with the figures.

FIG. 4 depicts a method of IoT data management based on a blockchain system, according to embodiments of the present disclosure. The method moves from start 400 to operation 401. As depicted in FIG. 4, at block 401, IoT data is received by one or more processing units. A typical type of IoT data is GPS (Global Positioning System) data which can be represented as: <lon, lat, height, speed, heading, . . . >, wherein lon is longitude, lat is latitude, height is height and speed is the speed of moving object, heading is moving direction.

At block 403, at least one aggregation pattern of the IoT data are determined by one or more processing units. According to the long term observation of inventors of the present disclosure, it is found that IoT data mainly have two typical types. One type is periodical data, and the other type is event data. Periodical data always happen in periodical intervals, for example, every 10 seconds. It's typically a status data being monitored and captured every interval. Original periodical data can be represented as: <id1, t1, data1>, <id1, t2, data2>, . . . <id1, tn, datan>, wherein id is an identity of a device, t is a timestamp, and data1, data2, . . . datan are measured values, n is a natural number. In one embodiment, the original periodical data can be conveniently represented as: <id1, ts, te, interval, dataset>, wherein ts is the starting-timestamp, te is the ending-timestamp, interval is the time intervals, and dataset is a set of data happened in the duration of (te-ts). Event data happen at any timestamp, e.g., when a car collision happens, the data from the sensors can be obtained as event data. Event data can be represented as: <id1, tn, data1>. Event data can be also represented as: <id1, tn, tn, 0, data1> to be consisted with the representation of periodical data. The representation of IoT data should not be a limitation for the present disclosure, a person in the art can use any proper representation of IoT data.

According to a long term observation of inventors of the present disclosure, it is found that IoT data are naturally grouped together for processing and usage, e.g., GPS data: <lon, lat, height, speed, heading, . . . >, and the typical usages of IoT data can lead better storage design and implementation, e.g., time-series query on temporal data leads to storage and key design for HBase (HBase is an open-source, non-relational, distributed database).

Based on the findings above, at least one aggregation pattern of the IoT data is determined by the one or more processing units. Another exemplary embodiment will be described to show how the at least one aggregation pattern of the IoT data is determined in details.

At block 405, the IoT data are hashed based on the at least one aggregation pattern to obtain hash values of the IoT data, using one or more processing units. A hash function is any function that can be used to map data of arbitrary size to data of a fixed size. The values returned by a hash function are called hash values. In an exemplary embodiment, a hierarchical structure can be built for the at least one aggregation pattern and the IoT data can be reorganized based on the hierarchical structure. The reorganized IoT data can be hashed based on the hierarchical structure. Another exemplary embodiment will be described to show how the hashing is carried out in details.

Operation 407 corresponds to the hash values being sent to a blockchain system for storing, using one or more processing units. In one embodiment, the hash values can be stored in the blockchain system and the reorganized IoT data can be stored in an IoT data store. In one embodiment, the hash values can be indexed to obtain hash indexes based on the hash values and the IoT data of the corresponding at least one pattern. One of skill in the art can leverage any proper database technology to index the hash values. The hash indexes can be stored in the IoT data store or in the blockchain system. Another exemplary embodiment will be described to show how a verification user can query the IoT data based on the hash value or based on both the hash value and the hash index. Once operation 407 is completed, the method ends at block 409.

Figure 5:
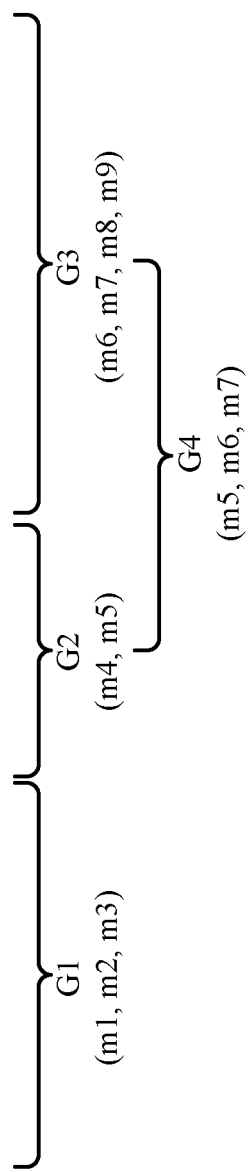
FIG. 5 depicts an aggregation pattern determined in a hierarchical structure, according to embodiments consistent with the figures.

FIG. 5 depicts determining aggregation patterns in a hierarchical structure according to an embodiment of the present disclosure. Table 1 depicts the typical periodical data, m1, m2, . . . m9 are the time sections, and id1, id2, . . . , idn are the device identity. According to the history queries, some aggregation patterns are determined as: G1 (m1, m2, m3), G2 (m4, m5), G3 (m6, m7, m8, m9) and G4 (m5, m6, m7), wherein G1 (m1, m2, m3) means that the IoT data of time section m1, m2, m3 are queried together frequently, and G2 (m4, m5), G3 (m6, m7, m8, m9) and G4 (m5, m6, m7) have similar meaning. The aggregation patterns can be organized in a hierarchical structure depicted in FIG. 5 according to an embodiment of the present disclosure. A person in the art can leverage any proper hierarchical structure, e.g., binary tree, balanced tree etc., in the present disclosure. It should be clear to one of skill in the art that the hierarchical structure depicted in FIG. 5 is merely for the purpose of simplifying illustration and will not limit the scope of the disclosure.

TABLE 1

| | Time Section | | | | | | | | |
|---|---|---|---|---|---|---|---|---|---|
| | m1 | m2 | m3 | m4 | m5 | m6 | m7 | m8 | m9 ... |
| id1 | ... | ... | ... | ... | ... | ... | ... | ......... |
| id2 | ... | ... | ... | ... | ... | ... | ... | ......... |
| ... | ... | ... | ... | ... | ... | ... | ... | ......... |
| id16 | ... | ... | ... | ... | ... | ... | ... | ......... |

The fundamental factors of aggregation patterns in hierarchical structure can be scaled out or scale in, e.g., temporal: seconds→minutes→hours→days . . . ; spatial: 10 meters around→100 meters→1 KM, or leverage map zoom-in/out capabilities; conceptual: points→trajectory→route.

The aggregation pattern can be determined by at least one of: rules predefined by a field expert, e.g., (1) flow rate is always summarized in hours, (2) air quality is always reported in a coverage with the center as one specific position etc.; a pattern learned from machine learning, e.g., (1) Longitude is always being queried with Latitude when doing GPS querying; (2) car speed queries are always along with specific roads etc. Machine learning algorithms can include but are not limited to clustering, regression and deep neutral network. One of skill in the art of machine learning algorithms could leverage any proper machine learning algorithms to determine the aggregation patterns. Such use of machine learning algorithms will not be discussed further in detail herein for the purpose of simplifying the discussion and illustration. On the other hand, the aggregation patterns determined can be further optimized based on newer IoT data queries.

Referring to FIG. 5, the original IoT data can be re-organized based on the aggregation patterns and be stored in the IoT data store. The re-organized IoT data can be hashed based on the aggregation patterns to obtain hash values of the re-organized IoT data. For example, (m1, m2, m3) are found being used together frequently during fixed duration, e.g., in every 4 seconds, and they can be grouped as G1 (m1, m2, m3) and re-organized, such aggregation can be called as level 1, then G1 (m1, m2, m3) can be hashed at level 1. Similarly, G2 (m4, m5) can be hashed at level 2, and G3 (m6, m7, m8, m9) can be hashed at level 3. G4 (m5, m6, m7)

is a secondary aggregation of G2 and G3, that is to aggregate data (m4, m5, m6, m7, m8, m9), and G4 can be hashed too. One of skill in the art can leverage any proper hash algorithms such as MD5, CRC and SHA. It can be understood that the choice of hash function must be such that changes in the source, i.e., hashed data, result in changes in the hash value that are difficult to predict.

Figure 6:
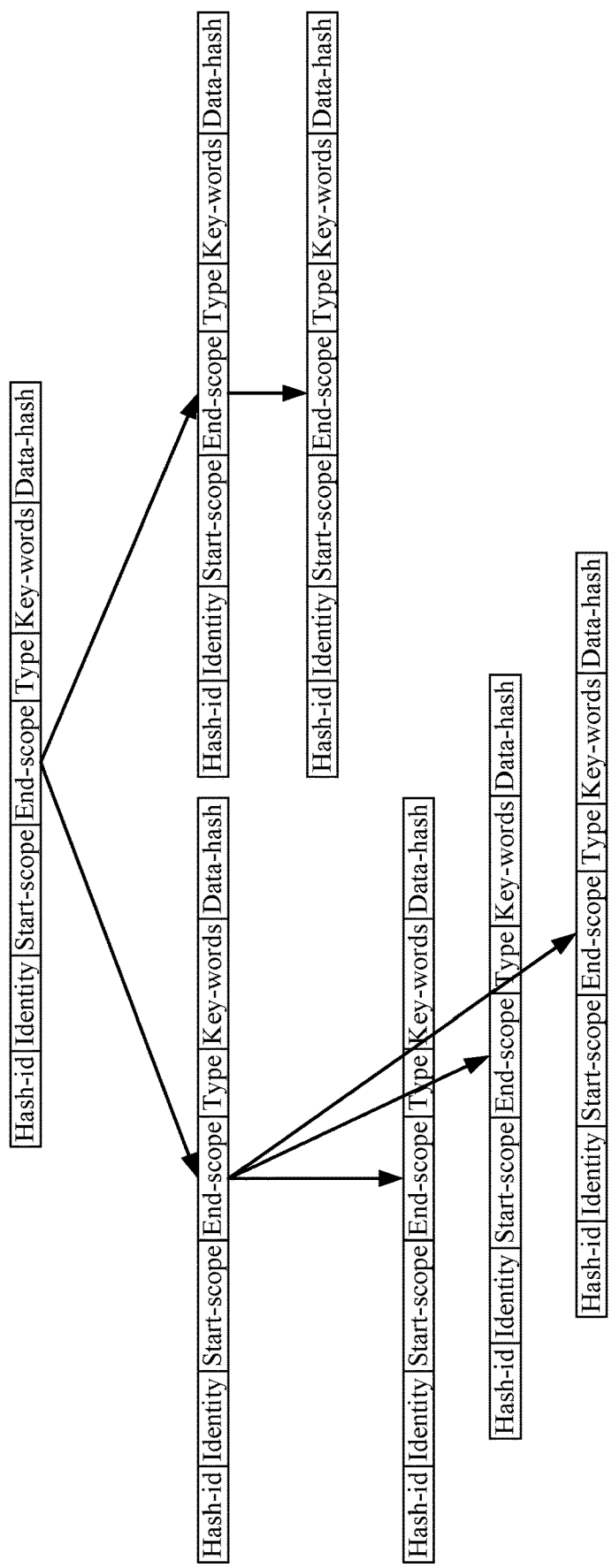
FIG. 6 depicts a hash table with a hierarchical structure, according to embodiments consistent with the figures.

FIG. 6 depicts a hash table having a hierarchical structure, according to embodiments. The hash table includes many nodes, using a node 601 as an example, wherein Hash-id is an identity of the hash block, it should be unique in the whole system, each one represents one data-hash, and Identity is the original identity of the IoT object (or device), and Start-scope is a starting timestamp, and End-scope is an ending timestamp, and Type is the IoT data type, including periodical, event, and so on, and Key-words are some key words that can describe the IoT data block, and Data-hash is the hash value of the original IoT data section. In embodiments, each tree node of hierarchical structure has pointers to its children and a backward pointer to its father.

FIG. 7 depicts mappings between a hash value and IoT device identity, data type and data keywords, respectively. In order to speed up IoT data retrieving, at least one mapping is built, using one or more processing units, between a hash value and at least one of IoT device identity, IoT data type or IoT data keyword, according to embodiments of the present disclosure. Identity Mapping 701 can mainly deal with the situation that multiple hash values can exist in one IoT data. For example, a vehicle trajectory can be divided into multiple segments according to different time granularity, e.g., second, minute, hour, day, etc., and each segment is hashed respectively. Type mapping 703 can mainly deal with the problem of data type and hash fragment mapping. For example, event data is a data type, and there are many IoT data belonging to the event data. Through the type mapping 703, the hash values belonging to the event can be located, thereby speed up the retrieving of event-type IoT data. A client can label each piece of IoT data by keyword. For example, if each piece of air quality data is labeled as serious pollution, then after querying the heavily polluted air quality data, the keyword label can be used to speed up the retrieving. A keyword and a hash fragment can be corresponding to each other, that is, one keyword can be corresponding to multiple hash segments, and a hash segment can contain multiple keywords. The keywords mapping 705 can be built based on the keywords and hash ids. It is well known that the hierarchical structure of the hash table can also be used to speed up the IoT data retrieving.

Figure 8:
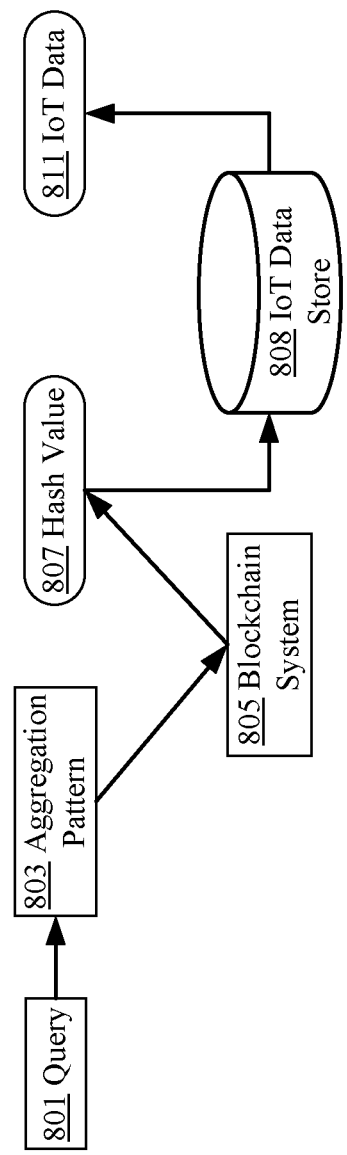
FIG. 8 depicts how IoT data can be retrieved, according to embodiments consistent with the figures.

FIG. 8 depicts how IoT data can be retrieved, according to embodiments of the present disclosure. An IoT data query 801 from a verification client can be received. For example, if the client can want to know the car track between 10:00 AM and 11:00 AM of 2018 Dec. 12, the IoT data query can include the parameters such as the car identity, starting time (10:00 AM) and ending time (11:00 AM). The aggregation pattern 803 associated with the car identity and the time section(s), i.e., 10:00 AM-11:00 AM of 2018 Dec. 12, can be identified, and because each time section of each car has a corresponding hash value, then the hash value 807 of the car and the time section can be determined, wherein the hash value 807 can be stored in blockchain system 805. When the hash value is determined, the IoT data 811 of the car and the time section can be retrieved from the IoT data store 809 based on the hash value. In one embodiment, the hash indexes can be stored in the IoT data store 809, and the hash indexes include hash values and corresponding sections of IoT data. Once the hash value is determined, the corresponding sections of IoT data could be found in the IoT data store 809 based on the hash indexes.

According to embodiments of the present disclosure, when the sections of the IoT data are retrieved, a hash value of at least one section of the retrieved IoT data can be calculated. In embodiments, in response to the corresponding hash value stored in the blockchain system being matched with the calculated hash value of the corresponding section of the retrieved IoT data, the retrieved IoT data can be reported as being not tampered with, and the retrieved IoT data can be sent to the client. In another embodiment of the present disclosure, in response to a corresponding hash value stored in the blockchain system being not matched with the calculated hash value of the corresponding section of the retrieved IoT data, the retrieved IoT data can be reported as being tampered with.

Figure 9:
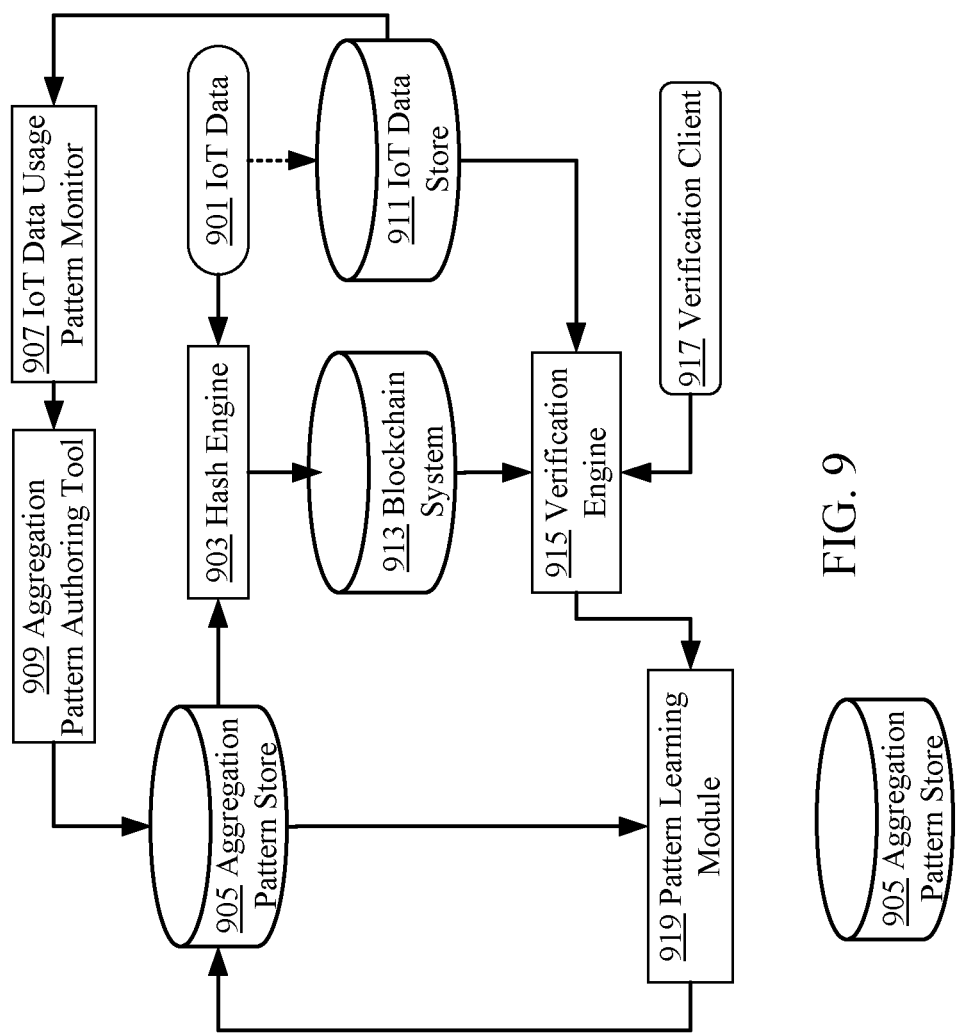
FIG. 9 depicts an IoT data management system, according to embodiments consistent with the figures.

FIG. 9 depicts an IoT data management system 900 according to embodiments of the present disclosure. The original IoT data 901 are received, and the original IoT data 901 can be stored in the IoT data store 911, the IoT data store 911 can be database with huge size, such as Hbase, HDFS, etc. The IoT data usage pattern monitor 907 can monitor the usage patterns of the IoT data, and the aggregation pattern authoring tool 909 can be used to determine and generate aggregation patterns based on the monitor output. The aggregation patterns determined can be stored in the aggregation pattern store 905. The hash engine 903 can hash the IoT data 901 based on the determined aggregation patterns to obtain hash values of the IoT data, and the hash values can be stored in the blockchain system 913. In one embodiment of the present disclosure, the original IoT data can be re-organized based on the aggregation patterns and be stored in the IoT data store 911 too. In another embodiment of the present disclosure, the hash values can be indexed and the hash indexes can be stored in the IoT data store 911. The verification engine 915 can receive an IoT data query from a verification client 917 and retrieve the IoT data from the IoT data store 911, and it can verify the hash value of the retrieved IoT data with the one retrieved from the Blockchain System 913. If the two hash values are not matched, the retrieved IoT data will be reported as being tampered with, otherwise, the retrieved IoT data will be returned to the verification client. In one embodiment of the present disclosure, the pattern learning module 919 can learn more or better aggregation pattern from queries from the verification client 917, and the improved aggregation patterns can be stored in aggregation pattern store 905 for further usage. In this way, the pattern learning module 919 can help the IoT data management system 900 to keep self-improving. The IoT data management system 900 is used to explain the IoT data management processes, and it should be clear to a person in the art that the above description is merely for the purpose of simplifying illustration and will not adversely limit the scope of the disclosure.

It can be noted that embodiments are described above as having aggregation patterns with hierarchical structure, however, this is for ease of understanding of the present disclosure, and thus does not limit the scope of the disclosure. For example, a person skilled in the art can leverage the methods of this disclosure based on any proper aggregation patterns, and thus this technique will not be discussed in detail, for the purpose of simplifying illustration.

It can be noted that the IoT data management according to embodiments of this disclosure could be implemented by computer system/server 12 of FIG. 1.

The present disclosure can be a system, a method, and/or a computer program product at any possible technical detail level of integration. The computer program product can include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter condition, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform aspects of the present disclosure.

Aspects of the present disclosure are described herein with reference to flow diagram illustrations and/or block diagrams of methods, apparatus (systems), and computer program products according to embodiments of the disclosure. It will be understood that each block of the flow diagram illustrations and/or block diagrams, and combinations of blocks in the flow diagram illustrations and/or block diagrams, can be implemented by computer-readable program instructions.

These computer-readable program instructions can be provided to a processor of a general purpose computer, special-purpose computer, or other programmable data processing apparatus to produce a machine, such that the instructions, which execute via the processor of the computer or other programmable data processing apparatus, create means for implementing the functions/acts specified in the flow diagram and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flow diagram and/or block diagram block or blocks.

The computer-readable program instructions can also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flow diagram and/or block diagram block or blocks.

The flow diagram and block diagrams in the Figures illustrate the architecture, functionality, and operation of possible implementations of systems, methods, and computer program products according to various embodiments of the present disclosure. In this regard, each block in the flow diagram or block diagrams can represent a module, segment, or portion of instructions, which comprises one or more executable instructions for implementing the specified logical function(s). In some alternative implementations, the functions noted in the blocks can occur out of the order noted in the Figures. For example, two blocks depicted in succession can, in fact, be executed substantially concurrently, or the blocks can sometimes be executed in the reverse order, depending upon the functionality involved. It will also be noted that each block of the block diagrams and/or flow diagram illustration, and combinations of blocks in the block diagrams and/or flow diagram illustration, can be implemented by special-purpose hardware-based systems that perform the specified functions or acts or carry out combinations of special-purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, using one or more processing units, internet of things (IoT) data;
determining, with one or more processing units, at least one aggregation pattern of the IoT data;
hashing, with one or more processing units, the IoT data based on the at least one aggregation pattern to obtain hash values of the IoT data; and
sending, with one or more processing units, the hash values to a blockchain system for storing;
wherein:
the at least one aggregation pattern is a pattern learned from machine learning; and
the hashing comprises:
building, with one or more processing units, a hierarchical structure for the at least one aggregation pattern; and
hashing, with one or more processing units, the IoT data based on the hierarchical structure; and
a tree node of the hierarchical structure being associated with:
a child node and the tree node comprising a forward pointer to its child; and
a parent node and the tree node comprising a backward pointer to its parent.

2. The method of claim 1, further comprising:
reorganizing, with one or more processing units, the IoT data based on the hierarchical structure.

3. The method of claim 2, further comprising:
storing, with one or more processing units, the reorganized IoT data in an IoT data store.

4. The method of claim 1, further comprising:
indexing, with one or more processing units, the hash values based on the hash values and the IoT data of the corresponding at least one aggregation pattern to obtain hash indexes.

5. The method of claim 1, further comprising:
storing, with one or more processing units, the hash values that are indexed based on an IoT data store.

6. The method of claim 1, further comprising:
receiving, with one or more processing units, an IoT data query from a verification client; and
retrieving, with one or more processing units, the IoT data from an IoT data store based on the hash values stored in the blockchain system.

7. The method of claim 6, further comprising:
calculating, with one or more processing units, at least one hash value of the retrieved IoT data;
reporting, with one or more processing units;
in response to a corresponding hash value stored in the blockchain system being unmatched with the calculated at least one hash value of the retrieved IoT data, the retrieved IoT data being tampered with; and
in response to a corresponding hash value stored in the blockchain system being matched with the calculated at least one hash value of the retrieved IoT data, the retrieved IoT data as being not tampered with.

8. The method of claim 5, further comprising:
retrieving, with one or more processing units, the IoT data from the IoT data store based on the hash values.

9. The method of claim 1, further comprising:
optimizing, with one or more processing units, the at least one aggregation pattern based on IoT data queries.

10. The method of claim 1, wherein at least one mapping is built, with one or more processing units, between a hash value and at least one of IoT device identity, IoT data type or IoT data keyword.

11. A computer system, comprising:
a processor;
a computer-readable memory coupled to the processor, the memory comprising instructions that when executed by the processor perform actions of:
receiving internet of things (IoT) data;
determining at least one aggregation pattern of the IoT data;
hashing the IoT data based on the at least one aggregation pattern to obtain hash values of the IoT data; and
sending the hash values to a blockchain system for storing;
wherein the at least one aggregation pattern is a pattern learned from machine learning; and
the hashing comprises:
building, with one or more processing units, a hierarchical structure for the at least one aggregation pattern; and
hashing, with one or more processing units, the IoT data based on the hierarchical structure; and
a tree node of the hierarchical structure being associated with:
a child node and the tree node comprising a forward pointer to its child; and
a parent node and the tree node comprising a backward pointer to its parent.

12. The computer system of claim 11, further comprising:
reorganizing the IoT data based on the hierarchical structure.

13. The computer system of claim 11, further comprising:
receiving an IoT data query from a verification client; and
retrieving the IoT data from an IoT data store based on the hash values stored in the blockchain system.

14. The computer system of claim 13, further comprising:
calculating at least one hash value of the retrieved IoT data; and
reporting, in response to a corresponding hash value stored in the blockchain system being not matched with the calculated at least one hash value of the retrieved IoT data, the retrieved IoT data being tampered with; and
reporting, in response to the corresponding hash value stored in the blockchain system being matched with the calculated at least one hash value of the retrieved IoT data, the retrieved IoT data as being not tampered with.

15. The computer system of claim 11, further comprising optimizing the at least one aggregation pattern based on IoT data queries.

16. A computer program product, comprising a computer-readable storage medium having program instructions embodied therewith, the program instructions executable by a processor to cause the processor to perform actions of:
receiving internet of things (IoT) data;
determining at least one aggregation pattern of the IoT data;
hashing the IoT data based on the at least one aggregation pattern to obtain hash values of the IoT data; and
sending the hash values to a blockchain system for storing;

wherein the aggregation pattern is a pattern learned from machine learning; and the hashing comprises:
- building, with one or more processing units, a hierarchical structure for the at least one aggregation pattern; and
- hashing, with one or more processing units, the IoT data based on the hierarchical structure; and a tree node of the hierarchical structure being associated with:
- a child node and the tree node comprising a forward pointer to its child; and
- a parent node and the tree node comprising a backward pointer to its parent.

17. The method of claim 1, wherein the aggregation patterns are based on temporal factors.

18. The method of claim 1, wherein the aggregation patterns are based on spatial factors.

* * * * *